United States Patent
Imai

(10) Patent No.: US 8,850,184 B2
(45) Date of Patent: Sep. 30, 2014

(54) TRANSMISSION MANAGEMENT APPARATUS, PROGRAM, TRANSMISSION MANAGEMENT SYSTEM, AND TRANSMISSION MANAGEMENT METHOD

(71) Applicant: Takuya Imai, Tokyo (JP)
(72) Inventor: Takuya Imai, Tokyo (JP)
(73) Assignee: Ricoh Company, Limited, Tokyo (JP)
( * ) Notice: Subject to any disclaimer, the term of this patent is extended or adjusted under 35 U.S.C. 154(b) by 0 days.

(21) Appl. No.: 13/989,653
(22) PCT Filed: Oct. 18, 2012
(86) PCT No.: PCT/JP2012/077527
§ 371 (c)(1),
(2), (4) Date: May 24, 2013
(87) PCT Pub. No.: WO2013/069461
PCT Pub. Date: May 16, 2013

(65) Prior Publication Data
US 2014/0055555 A1  Feb. 27, 2014

(30) Foreign Application Priority Data
Nov. 10, 2011  (JP) .................................. 2011-246514

(51) Int. Cl.
H04L 29/06 (2006.01)
H04N 7/15 (2006.01)
H04L 29/08 (2006.01)
G06F 21/62 (2013.01)

(52) U.S. Cl.
CPC .......... *H04N 7/152* (2013.01); *H04L 29/06517* (2013.01); *H04L 29/06523* (2013.01); *H04L 63/08* (2013.01); *H04L 29/06421* (2013.01); *H04L 67/28* (2013.01); *H04L 63/205* (2013.01); *G06F 21/62* (2013.01); *H04L 63/0428* (2013.01); *H04N 7/15* (2013.01)
USPC ........................................................ 713/153

(58) Field of Classification Search
USPC .......................................... 713/193, 153, 150
See application file for complete search history.

(56) References Cited

U.S. PATENT DOCUMENTS 6,298,060 B1 * 10/2001 Miyakawa et al. ........... 370/400
2006/0277406 A1  12/2006 Hashimoto et al.
(Continued)

FOREIGN PATENT DOCUMENTS

JP    63/155839    6/1988
JP    2006/157211  6/2006
(Continued)

OTHER PUBLICATIONS

International Search Report issued Feb. 5, 2013 in PCT/JP2012/077527 filed Oct. 18 2012.
(Continued)

*Primary Examiner* — Ali Abyaneh
(74) *Attorney, Agent, or Firm* — Oblon, Spivak, McClelland, Maier & Neustadt, L.L.P.

(57) ABSTRACT

A transmission management apparatus includes a receiving unit that receives, from a first transmission terminal 10, a communication request for a communication with a second transmission terminal 10; a fists storage unit that stores therein terminal identification information for identifying the transmission terminals 10 and relay device identification information for identifying a relay device 30 that relays data to be transmitted and received by the first transmission terminal 10, in an associated manner; a relay device selecting unit that selects the relay device 30 associated with the terminal identification information of the first transmission terminal 10 in the first storage unit; a second storage unit that stores therein the relay device identification information and encryption necessity information in an associated manner; and an encryption necessity determining unit that determines whether encryption is needed based on the encryption necessity information associated, in the second storage unit, with the relay device 30 selected by the relay device selecting unit.

8 Claims, 13 Drawing Sheets

(56) References Cited

U.S. PATENT DOCUMENTS

| | | | |
|---|---|---|---|
| 2008/0101346 A1* | 5/2008 | Shibata | 370/352 |
| 2008/0310630 A1 | 12/2008 | Candelore | |
| 2010/0058051 A1* | 3/2010 | Imai | 713/152 |
| 2010/0268937 A1 | 10/2010 | Blom et al. | |
| 2011/0202757 A1 | 8/2011 | Nakagawa et al. | |

FOREIGN PATENT DOCUMENTS

| | | |
|---|---|---|
| JP | 2006/217446 | 8/2006 |
| JP | 2006/352834 | 12/2006 |
| JP | 2008/227923 | 9/2008 |
| JP | 2010/531562 | 9/2010 |
| JP | 2011/188476 | 9/2011 |
| WO | 2009/070075 | 6/2009 |

OTHER PUBLICATIONS

Notification of Transmittal of the International Search Report and the Written Opinion of the International Searching Authority, dated Feb. 5, 2013, for Internationai Patent Application No. PCT/JP2012/077527 filed Oct. 18, 2012.

* cited by examiner

FIG.4

| TERMINAL ID | PASSWORD |
|---|---|
| ID001 | aaaa |
| ID002 | abab |
| ... | ... |

| REQUEST SOURCE TERMINAL ID | DESTINATION TERMINAL ID |
|---|---|
| ID001 | ID002, ID003, ... |
| ID002 | ID001, ID010, ... |
| ... | ... |
| ID014 | ID007 |

| TERMINAL ID | RELAY DEVICE ID | PRIORITY |
|---|---|---|
| ID001 | 1.2.3.4 | 1 |
| ID001 | 1.2.1.2 | 2 |
| ID001 | 3.4.5.6 | 3 |
| ID002 | 1.2.1.2 | 1 |
| ID002 | 3.4.5.6 | 2 |
| ID003 | 1.2.1.2 | 1 |
| ID003 | 4.5.6.7 | 2 |
| ID003 | 3.4.5.6 | 3 |
| ID004 | 1.2.2.2 | 1 |
| ID005 | 4.5.6.7 | 1 |
| ID005 | 1.2.2.2 | 2 |
| ... | ... | ... |

| TERMINAL ID | RELAY DEVICE ID | | |
|---|---|---|---|
| | PRIORITY 1 | PRIORITY 2 | PRIORITY 3 |
| ID001 | 1.2.3.4 | 1.2.1.2 | 3.4.5.6 |
| ID002 | 1.2.1.2 | 3.4.5.6 | |
| ID003 | 1.2.1.2 | 4.5.6.7 | 3.4.5.6 |
| ID004 | 1.2.2.2 | | |
| ID005 | 4.5.6.7 | 1.2.2.2 | |
| ... | ... | ... | ... |

FIG.8

| RELAY DEVICE ID | ENCRYPTION FLAG |
|---|---|
| 1.2.3.4 | FALSE |
| 2.3.4.5 | FALSE |
| 3.4.5.6 | TRUE |
| 4.5.6.7 | FALSE |

524

TRANSMISSION MANAGEMENT APPARATUS, PROGRAM, TRANSMISSION MANAGEMENT SYSTEM, AND TRANSMISSION MANAGEMENT METHOD

TECHNICAL FIELD

The present invention relates to a transmission management apparatus, a program, a transmission management system, and a transmission management method.

BACKGROUND ART

Conventionally, as an example of a transmission system that enables transmission and reception of contents data between a plurality of transmission terminals via a relay device, there is a known teleconference system for conducting a teleconference via a communication network, such as the Internet.

In the teleconference system, when the contents data, such as video or audio, is transmitted and received, the contents data is encrypted to ensure the security of the contents data. As a method for encrypting the contents data, for example, secure real-time transport protocol (SRTP) (RFC 3711) or the like is known.

As the method for encrypting the contents data, for example, Japanese Translation of PCT international application publication No. 2010-531562 discloses a technology, in which a packet to be encrypted is selected from a plurality of packets of digital video contents according to a selection criterion and the selected packet is encrypted in order to form selectively-encrypted digital video contents.

However, encryption and decryption processes in the transmission system greatly consume hardware resources of the transmission system. This reduces the real time performance in a communication of the contents data and causes video loss or audio jumping.

The present invention has been made in view of the above, and an object thereof is to provide a transmission management apparatus, a program, a transmission management system, and a transmission management method capable of realizing high-quality data transmission while ensuring the security of data transmitted and received by a transmission system.

DISCLOSURE OF INVENTION

According to an aspect of the invention, there is provided a transmission management apparatus including: a receiving unit that receives, from a first transmission terminal being one of transmission terminals connected to a network, a communication request for a communication with a second transmission terminal among the transmission terminals, terminal identification information for identifying the first transmission terminal, and terminal identification for identifying the second transmission terminal; a first storage unit that stores therein terminal identification information for identifying the transmission terminals and relay device identification information for identifying a relay device in an associated with, the relay device being connected to the network and configured to relay data transmitted and received by the first transmission terminal; a relay device selecting unit that selects a relay device associated with the terminal identification information of the first transmission terminal in the first storage unit; a second storage unit that stores therein the relay device identification information and encryption necessity information indicating whether it is necessary to encrypt data to be transmitted and received by the relay device identified by the relay device identification information, in an associated manner; an encryption necessity determining unit that determines whether encryption is needed based on the encryption necessity information associated, in the second storage unit, with the relay device selected by the relay device selecting unit; and a transmitting unit that transmits a determination result obtained by the encryption necessity determining unit to the first transmission terminal and the second transmission terminal.

According to another aspect of the invention, there is provided a program executed on a computer connected to a first transmission terminal and a second transmission terminal via a network among a plurality of transmission terminals connected to the network, the computer including: a first storage unit that stores therein terminal identification information for identifying the transmission terminals and relay device identification information for identifying a relay device, the relay device being connected to the network and configured to relay data transmitted and received by the first transmission terminal, in an associated manner; and a second storage unit that stores therein the relay device identification information and encryption necessity information indicating whether it is necessary to encrypt data to be transmitted and received by the relay device identified by the relay device identification information, the program causing the computer to execute: a receiving step of receiving, from the first transmission terminal, a communication request for a communication with the second transmission terminal, terminal identification information for identifying the first transmission terminal, and terminal identification information for identifying the second transmission terminal; a relay device selecting step of selecting a relay device associated with the terminal identification information of the first transmission terminal in the first storage unit; an encryption necessity determining step of determining whether encryption is needed based on the encryption necessity information associated, in the second storage unit, with the relay device selected at the relay device selecting step; and a transmitting step of transmitting a determination result obtained at the encryption necessity determining step to the first transmission terminal and the second transmission terminal.

According to still another aspect of the present invention, there is provided a transmission system including: a plurality of transmission terminals that transmit data via a network; and a transmission management apparatus that is connected to the transmission terminals via the network and that manages data transmission between the transmission terminals, wherein the transmission terminals include a transmitting unit that transmits a communication request for a communication with other transmission terminals connected to the network, the transmission management apparatus includes a receiving unit that receives, from a first transmission terminal among the transmission terminals, a communication request for a communication with a second transmission terminal among the transmission terminals, terminal identification information for identifying the first transmission terminal, and terminal identification information for identifying the second transmission terminal; a first storage unit that stores therein terminal identification information for identifying the transmission terminals and relay device identification information for identifying a relay device in an associated manner, the relay device being connected to the network and configured to relay data to be transmitted and received by the first transmission terminal; a relay device selecting unit that selects relay device identification information associated with the terminal identification information of the first transmission terminal in the first storage unit; a second storage unit that stores therein the relay device identification information and encryption necessity information indicating whether it is necessary to encrypt data to be transmitted and received by the relay device identified by the relay device identification information; an encryption necessity determining unit that determines whether encryption is needed based on the encryption necessity information associated, in the second storage unit, with the relay device identification information selected by the relay device selecting unit; and a transmitting unit that transmits a determination result obtained by the encryption necessity determining unit and the relay device identification information selected by the relay device selecting unit to the first transmission terminal and the second transmission terminal, and the transmission terminals further include: a receiving unit that receives the determination result and the relay device identification information from the transmission management apparatus; and a cryptography processing unit that encrypts data when the determination result obtained by the receiving unit of the transmission terminal indicates that encryption is needed, wherein the transmitting unit of the transmission terminal transmits encrypted data to the relay device identified by the relay device identification information received by the receiving unit.

According to still another aspect of the present invention, there is provided a data transmission method implemented by a transmission system, the transmission system including: a plurality of transmission terminals that transmits data via a network; and a transmission management apparatus that is connected to the network and that manages data transmission between the transmission terminals, wherein the transmission management apparatus includes: a first storage unit that stores therein terminal identification information for identifying the transmission terminals and relay device identification information for identifying a relay device in an associated manner, the relay device being connected to the network and configured to relay data transmitted and received by the first transmission terminal; and a second storage unit that stores therein the relay device identification information and encryption necessity information indicating whether it is necessary to encrypt data to be transmitted and received by the relay device identified by the relay device identification, information, the data transmission method including: a first transmitting step of transmitting, by the transmission terminal, a communication request for a communication with the other transmission terminals connected to the network; a first receiving step of receiving, by the transmission management apparatus from a first transmission terminal among the transmission terminals, a communication request for a communication with a second transmission terminal among the transmission terminals, terminal identification information for identifying the first transmission terminal, and terminal identification information for identifying the second transmission terminal; a relay device selecting step of selecting, by the transmission management apparatus, relay device identification information associated with the terminal identification information of the first transmission terminal in the first storage unit; an encryption necessity determining step of determining, by the transmission management apparatus, whether encryption is needed based on the encryption necessity information associated, in the second storage unit, with the relay device identification information selected at the relay device selecting step; a second transmitting step of transmitting, from the transmission management apparatus to the first transmission terminal and the second transmission terminal, a determination result obtained at the encryption necessity determining step and the relay device identification information selected at the relay device selecting step; a second receiving step of receiving, by the transmission terminal from the transmission management apparatus, the determination result and the relay device identification information; a cryptography processing step of encrypting data by the transmission terminal when the determination result received at the second receiving step indicates that encryption is needed; and a third transmitting step of transmitting encrypted data from the transmission terminal to the relay device identified by the relay device identification information received at the second receiving unit.

BRIEF DESCRIPTION OF DRAWINGS

FIG. 4 is a diagram illustrating a data structure of an authentication DB;

FIG. 5 is a diagram illustrating a data structure of a destination terminal DB;

FIG. 6 is a diagram illustrating a data structure of a relay device DB;

FIG. 7 is a diagram illustrating a data structure of the relay device DB according to a modification;

FIG. 8 is a diagram illustrating a data structure of an encryption necessity DB;

BEST MODE(S) FOR CARRYING OUT THE INVENTION

Exemplary embodiments of a transmission management apparatus, a program, a transmission management system, and a transmission management method will be explained in detail below with reference to the accompanying drawings.

Figure 1:
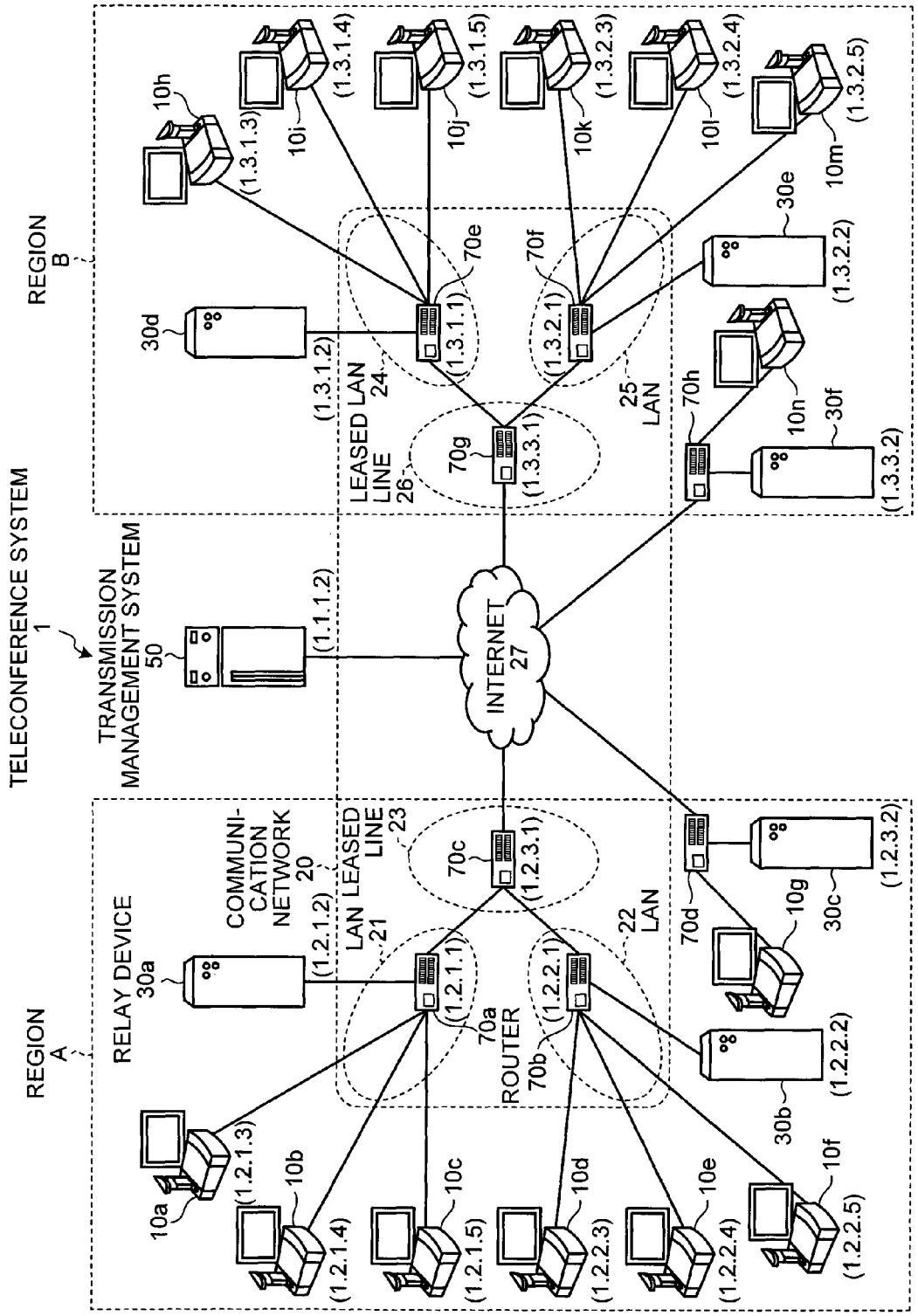
FIG. 1 a schematic diagram of a teleconference system.

FIG. 1 is a schematic diagram of a teleconference system 1 as a transmission management system. The teleconference system 1 includes a plurality of transmission terminals 10a to 10n, a plurality of relay devices 30a to 30f, a transmission management system 50 as a transmission management apparatus, and a plurality of routers 70a to 70h.

Hereinafter, an arbitrary transmission terminal among the transmission terminals 10a to 10n is simply described as "the transmission terminal 10", an arbitrary relay device among the relay devices 30a to 30f is simply described as "the relay device 30", and an arbitrary router among the routers 70a to 70h is simply described as "the router 70".

Each of the transmission terminals 10, each of the relay devices 30, the transmission management system 50, and each of the routers 70 are connected to one another via a communication network 20.

As illustrated in FIG. 1, in the teleconference system 1 according to the embodiment, the transmission terminals 10a to 10g, the relay devices 30a to 30c, and the routers 70a to 70d are installed in a region A.

The transmission terminals 10a to 10c, the relay device 30a, and the router 70a are communicably connected to one another via a LAN 21. The transmission terminals 10d to 10f, the relay device 30b, and the router 70b are communicably connected to one another via a LAN 22. The LAN 21 and the LAN 22 are communicably connected to each other via a leased line 23 including the router 70c. The leased line 23 is also connected to the Internet 27 in addition to the LANs 21 and 22. The transmission terminal 10g and the relay device 30c are directly connected to the Internet 27 via the router 70d without via a leased line.

Meanwhile, the transmission terminals 10h to 10n, the relay devices 30d to 30f, and the routers 70e to 70g are installed in a region B. The transmission terminals 10h to 10j, the relay device 30d, and the router 70e are communicably connected to one another via a LAN 24. The transmission terminals 10k to 10m, the relay device 30e, and the router 70f are communicably connected to one another via a LAN 25. The LAN 24 and the LAN 25 are communicably connected to each other via a leased line 26 including the router 70g. The leased line 26 is also connected to the Internet 27 in addition to the LANs 24 and 25. The transmission terminal 10n and the relay device 30f are directly connected to the Internet 27 via the router 70h without via a leased line.

For example, the region A is Japan, the LAN 21 is installed in an office in Tokyo, and the LAN 22 is installed in an office in Osaka. Furthermore, the region B is the United States of America, the LAN 24 is installed in an office in New York, and the LAN 25 is installed in an office in Washington D.C. All of the terminals and devices in the region A and the region B are communicably connected to one another via the routers 70c, 70d, 70g, and 70h and the Internet 27.

The LANs 21, 22, 24, and 25 are internal networks, such as local networks, to which only local and limited terminals and devices are connectable. The Internet 27 is an external network to which an unspecified number of terminals and devices are connectable. Specifically, the teleconference system 1 includes terminals and devices, such as the transmission terminals 10a to 10c, the relay device 30a, and the router 70a, connected to the internal network, and includes terminals and devices, such as the transmission terminal 10g, the relay device 30c, and the router 70d, connected to the external network. Therefore, in the teleconference system 1, data is transmitted and received between the transmission terminals 10 via only the internal network, via only the external network, or via both of the internal network and the external network. Examples of the data transmitted and received between the transmission terminals 10 include image data, such as moving image data and still image data, and voice data.

In FIG. 1, an IP address is shown near each of the transmission terminals 10, each of the relay devices 30, the transmission management system 50, and each of the routers 70. For example, the IP address of the transmission terminal 10a is "1.2.1.3". In the embodiment, the IP address in IPv4 is used. Alternatively, it may be possible to use IPv6 or fully qualified domain name (FQDN).

Each of the transmission terminals 10 may be used to make a call between a plurality of offices or between different rooms in the same office as well as to make a call in the same room, between indoor and outdoor locations, or in an outdoor location. When each of the transmission terminals 10 is used in an outdoor location, a wireless communication using a mobile phone communication network or the like may be performed.

In the teleconference system 1 according to the embodiment, the communication network 20 is formed of the LANs 21 and 22, the leased line 23, the LANs 24 and 25, the leased line 26, and the Internet 27. However, the communication network 20 may include a wireless communication using wireless fidelity (WiFi), Bluetooth (registered trademark), or the like in addition to a wired communication.

The number of the transmission terminals 10, the relay devices 30, and the routers 70 included in the teleconference system 1, and connection forms of the terminals or the like are not limited by the embodiment.

In the above configuration, the transmission terminal 10 transmits and receives image data and voice data as examples of contents data, that is, performs data transmission. The image data may be one or both of a still image and a moving image. The relay device 30 relays the contents data transmitted and received between a plurality of the transmission terminals 10 that conduct a teleconference. Specifically, the relay device 30 edits the contents data received from the transmission terminal 10 and generates teleconference data to be transmitted to each of the transmission terminals 10. The teleconference data includes image data and voice data to be displayed or output as voice during the teleconference by each of the transmission terminals 10 conducting the teleconference. The relay device 30 also transmits the generated teleconference data to the transmission terminals 10 that conduct the teleconference.

The transmission management system 50 manages data transmission related to the teleconference between the transmission terminals 10. Specifically, when receiving, from a predetermined transmission terminal 10, a start request to start a teleconference with other transmission terminal 10, the transmission management system 50 selects the relay device 30 to be used for the teleconference designated by the start instruction from among the relay devices 30a to 30f included in the teleconference system 1. Hereinafter, the transmission terminal 10 serving as a request source that issues a request to start a teleconference is described as a request source terminal, and the transmission terminal 10 serving as a destination to which the start request is issued is described as a destination terminal. The transmission management system 50 also performs login authentication from the transmission terminal 10 or manages the conversation status of the transmission terminal 10 for example. The transmission management system 50 also manages destination terminals with which each of the transmission terminals 10 can perform a teleconference or collectively manages the communication statuses of the relay devices 30 for example.

Figure 2:
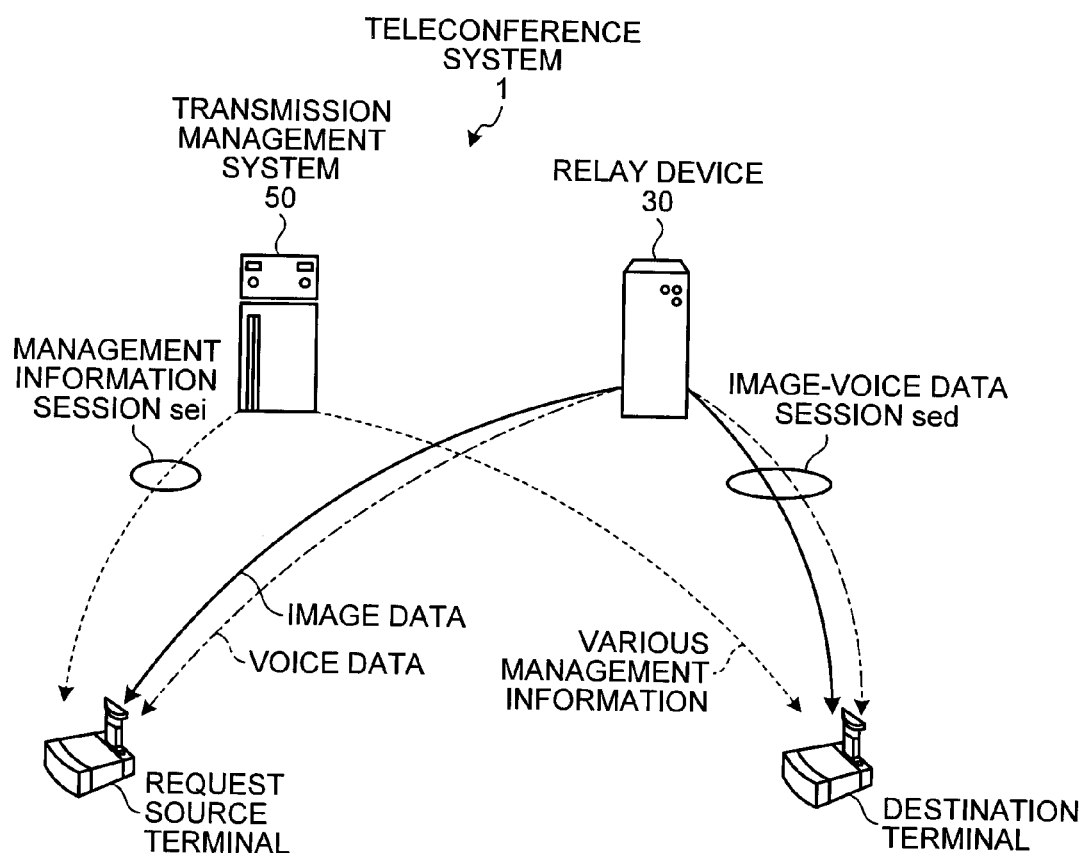
FIG. 2 is a diagram for explaining a session between a request source terminal and a destination terminal.

FIG. 2 is a diagram for explaining a session between the request source terminal and the destination terminal. As illustrated in FIG. 2, in the teleconference system 1, a management information session sei for transmitting and receiving various types of management information is established between the request source terminal and the destination terminal via the transmission management system 50. By using the management information session sei, connection control (call control) between the transmission terminals 10 is performed. In the call control, as a communication protocol for a communication between the transmission terminal 10 and the transmission management system 50, extensible messaging and presence protocol (XMPP), session initiation protocol (SIP), IP multimedia subsystem (IMS), bidirectional-streams over synchronous HTTP (BOSH), or the like may be used.

Furthermore, a session (image-voice data session sed) for transmitting and receiving image data and voice data is established between the request source terminal and the destination terminal via the relay device 30. In the image-voice data session sed, as a delivery protocol for the image data and the voice data, real-time transport protocol (RTP), hypertext transfer protocol (HTTP), or the like may be used.

The RTP may be used in conjunction with RTP control protocol (RTCP) as a protocol for controlling transmission and reception and for exchanging information between a transmission side and a reception side.

Each of the transmission terminals 10 and the relay devices 30 can compress the image data and the voice data. As for the image data, a compression method, such as H.264 or H.323, may be used. As for the voice data, a compression method, such as G.711 or G.722, may be used.

However, the communication protocols and the data compression methods described above are not limited by the embodiment.

Figure 3:
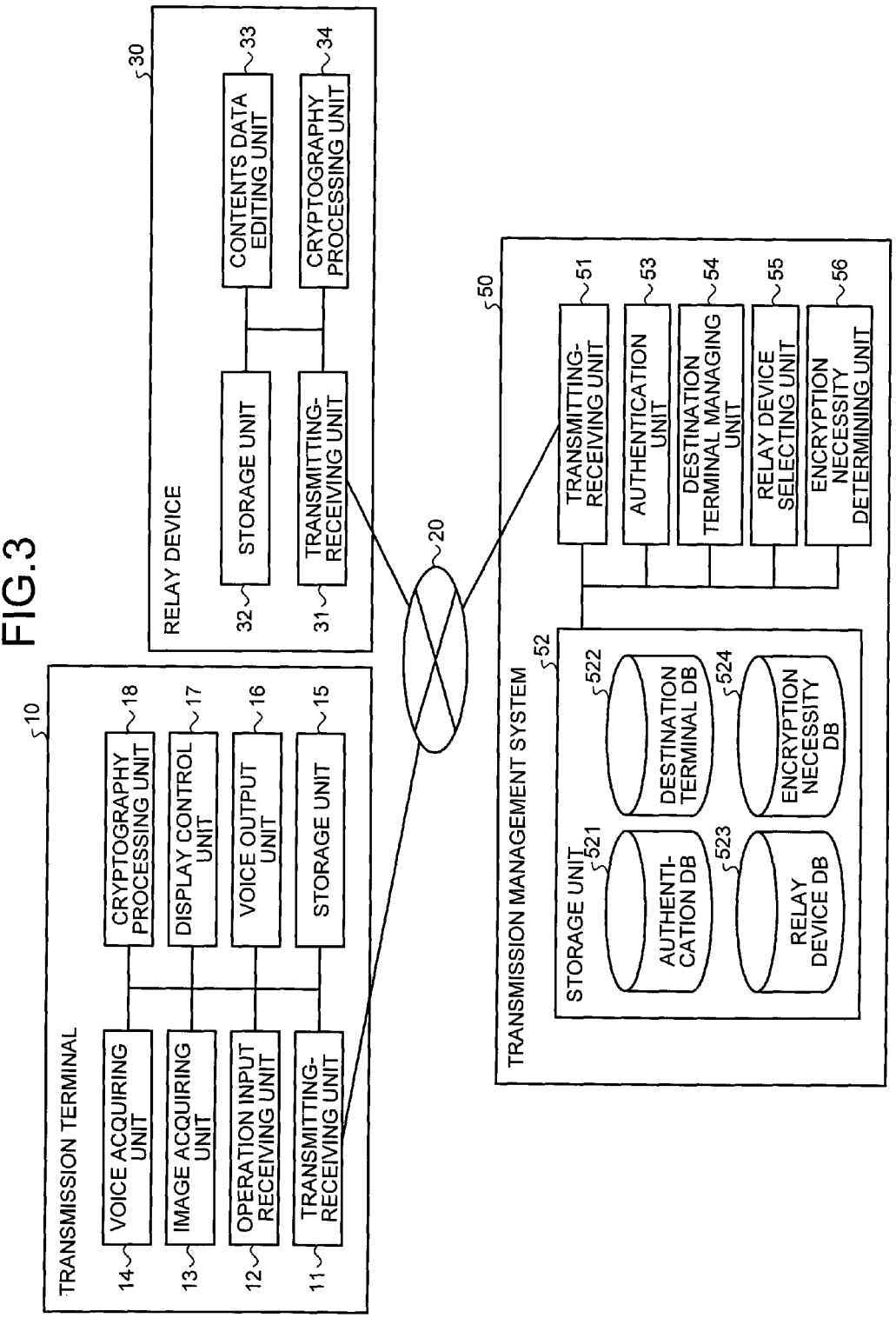
FIG. 3 is a block diagram of functional configurations of a transmission terminal, a transmission management system, and a relay device.

FIG. 3 is a block diagram of functional configurations of the transmission terminal 10, the transmission management system 50, and the relay device 30. The transmission terminal 10 includes a transmitting-receiving unit 11, an operation input receiving unit 12, an image acquiring unit 13, a voice acquiring unit 14, a storage unit 15, a voice output unit 16, a display control unit 17, a cryptography processing unit 18.

The transmitting-receiving unit 11 transmits and receives various types of information to and from other devices or the like included in the teleconference system 1 via the communication network 20. The transmitting-receiving unit 11 transmits, for example, a teleconference start request to the transmission management system 50.

The operation input receiving unit 12 is realized by operation buttons and a power switch to be described later, and receives an input of various types of information from a user. For example, when the user turns on the power switch, the operation input receiving unit 12 receives information on power-on.

The image acquiring unit 13 acquires, from an external apparatus, image data of an image or the like captured by a camera to be described later. The voice acquiring unit 14 acquires voice data from a microphone or the like to be described later. The storage unit 15 stores therein information transmitted and received in a teleconference, such as data received by the transmitting-receiving unit 11, image data acquired by the image acquiring unit 13, voice data acquired by the voice acquiring unit 14, and data transmitted and received in the teleconference. The storage unit 15 also stores therein information, such as a terminal ID for identifying the transmission terminal 10 and a password used for authenticating a user of the transmission terminal 10.

The voice output unit 16 outputs the voice data to a speaker or the like to be described later. The display control unit 17 outputs the image data to a display to be described later. The voice output unit 16 and the display control unit 17 output data stored in the storage unit 15.

The cryptography processing unit 18 appropriately encrypts the contents data to be transmitted to an external apparatus via the transmitting-receiving unit 11. The cryptography processing unit 18 also appropriately decrypts data received via the transmitting-receiving unit 11. The encrypted data is also stored in the storage unit 15.

The relay device 30 includes a transmitting-receiving unit 31, a storage unit 32, a contents data editing unit 33, and a cryptography processing unit 34. The transmitting-receiving unit 31 transmits and receives various types of information to and from other devices or the like included in the teleconference system 1 via the communication network 20. The transmitting-receiving unit 31 receives, for example, the contents data from the transmission terminal 10.

The storage unit 32 stores therein various types of information, such as the contents data received by the transmitting-receiving unit 31. The contents data editing unit 33 edits the contents data received by the transmitting-receiving unit 31 to thereby obtain teleconference data to be transmitted to the transmission terminal 10 conducting a teleconference. Specifically, the contents data editing unit 33 changes a frame rate of the image data or converts resolution for example. The cryptography processing unit 34 appropriately decrypts the data received by the transmitting-receiving unit 31. The cryptography processing unit 34 appropriately encrypts data to be transmitted via the transmitting-receiving unit 31.

Of the relay devices 30 included in the teleconference system 1 according to the embodiment, the relay devices such as the relay devices 30*c* and 30*f* that are connected to the external network such as the Internet 27, in which a fraudulent access by a third party is likely to occur, and that possibly transmit and receive data via the external network are provided with the cryptography processing unit 34 illustrated in FIG. 3, and the cryptography processing unit 34 encrypts the contents data to be transmitted and received by the relay devices.

By contrast, of the relay devices 30 included in the teleconference system 1, the relay devices such as the relay devices 30*a*, 30*b*, 30*d*, and 30*e* that are connected to the internal network, in which accessible terminals or the like are limited and a fraudulent access by a third party is less likely to occur, and that possibly transmit and receive data without via the external network have less need to encrypt the contents data to be transmitted and received as described above. Therefore, these relay devices do not include the cryptography processing unit 34 illustrated in FIG. 3.

Alternatively, the cryptography processing unit 34 may be provided in the relay devices connected to the internal network. In this case, an administrator or the like sets in advance whether to perform cryptography processing on each of the relay devices 30 depending on the destination connected to each of the relay devices 30.

The transmission management system 50 includes a transmitting-receiving unit 51, a storage unit 52, an authentication unit 53, a destination terminal managing unit 54, a relay device selecting unit 55, and an encryption necessity determining unit 56. The transmitting-receiving unit 51 transmits and receives various types of information to and from other devices or the like included in the teleconference system 1 via the communication network 20. The transmitting-receiving unit 51 transmits, for example, a teleconference start request from the transmission terminal 10.

The storage unit 52 stores therein an authentication DB 521, a destination terminal DB 522, a relay device DB 523, and an encryption necessity DB 524. The authentication DB 521 stores therein data for authenticating a user of each of the transmission terminals 10. The destination terminal DB 522 stores therein data for determining the transmission terminals 10 (the destination terminals) to which each of the transmission terminals 10 can transmit data for a teleconference or the like. The relay device DB 523 stores therein data for determining the relay devices 30 that are available to each of the transmission terminals 10 for conducting a teleconference.

The encryption necessity DB 524 stores therein data for determining whether it is necessary to encrypt data to be transmitted and received in a teleconference performed via each of the relay devices 30.

FIG. 4 is a diagram illustrating a data structure of the authentication DB 521. The authentication DB 521 stores therein a terminal ID and a password in an associated manner. FIG. 5 is a diagram illustrating a data structure of the destination terminal DB 522. The destination terminal DB 522 stores therein a request source terminal ID and a destination terminal ID in an associated manner. The request source terminal ID and the destination terminal ID are terminal IDs of the transmission terminals 10.

In the destination terminal DB 522, the destination terminals associated with the request source terminal ID are terminal IDs of the transmission terminals 10 to which the request source terminal can transmit data. The destination terminals to which each of the request source terminals can transmit data are determined in advance, and the predetermined destination terminal IDs are stored in the destination terminal DB 522 in association with the request source terminal ID.

The destination terminals to which each of the request source terminals can transmit data may be changeable. For example, it may be possible to add or delete a destination terminal ID that is stored in the destination terminal DB 522 in association with each of the request source terminal IDs, in accordance with a request from any of the transmission terminals 10.

FIG. 6 is a diagram illustrating a data structure of the relay device DB 523. The relay device DB 523 stores therein the terminal ID, a relay device ID, and a priority in an associated manner. The relay device ID is information for identifying the relay device 30. Each of the terminal IDs is associated with the relay device IDs of the relay devices 30 that are available to the transmission terminal 10 identified by the terminal ID. The priority is the order of priority of the relay devices 30 to be used by the associated transmission terminal 10 in a teleconference. The higher the priority of the relay devices 30, the higher the priority of the relay devices 30 to be used in the teleconference. The priority is a value set in advance by an administrator. For example, it may be possible to set a higher priority on the relay devices 30 connected to the internal network, such as an in-house LAN, in which accessible devices are limited, and set a lower priority on the relay devices 30 connected to the external network, such as the Internet 27, in which an unspecified number of devices are accessible.

FIG. 7 is a diagram illustrating a data structure of a relay device DB 525 according to a modification. In the relay device DB 523 illustrated in FIG. 6, one column for storing one relay device ID is provided for one terminal ID. By contrast, in the relay device DB 525 according to the modification, a plurality of columns for storing a plurality of relay device IDs are provided for one terminal ID.

When there are a plurality of the relay devices 30 available to one transmission terminal 10, in the relay device DB 523 illustrated in FIG. 6, the same terminal IDs are stored in a plurality of rows and a plurality of relay device IDs are stored in association with the same terminal IDs. By contrast, in the relay device DB 525 according to the modification illustrated in FIG. 7, when there are a plurality of the relay devices 30 available to one transmission terminal 10, a plurality of relay device IDs are stored in a plurality of columns in the same row of one terminal ID.

It is possible to specify the relay device IDs associated with the terminal ID by referring to either relay device DB. However, for example, when the number of relay device IDs stored in the relay device DB is large, the relay device IDs can be searched for at a faster speed by using the relay device DB 523 illustrated in FIG. 6 compared with using the relay device DB 525 illustrated in FIG. 7. Therefore, in this case, it is preferable to use the relay device DB 523. Alternatively, when the number of the relay device IDs stored in the relay device DB is small, the relay device IDs can be searched for at a faster speed by using the relay device DB 525 illustrated in FIG. 7 compared with using the relay device DB 523 illustrated in FIG. 6. Therefore, in this case, it is preferable to use the relay device DB 525.

FIG. 8 is a diagram illustrating a data structure of the encryption necessity DB 524. The encryption necessity DB 524 illustrated in FIG. 8 stores therein the relay device ID and an encryption flag in an associated manner. The encryption flag is information indicating whether it is necessary to encrypt data to be relayed by the relay device 30 identified by the relay device ID. In the embodiment, "TRUE" indicates that the encryption is needed and "FALSE" indicates that the encryption is not needed.

In the encryption necessity DB 524, the encryption flag indicating that the encryption is needed is associated with the relay device ID of the relay device 30 that possibly relays (transmits and receives) data via the external network, such as the relay device 30 directly connected to the external network. In the encryption necessity DB 524, the encryption flag indicating that the encryption is not needed is associated with the relay device ID of the relay device 30 that possibly relays data via only the internal network without via the external network, such as the relay device 30 connected to the internal network.

Even when the relay device 30 is connected to the internal network, if the relay device 30 possibly relays data via the external network, the relay device may be associated with the encryption flag indicating that the encryption is needed. The relay device. ID and the necessity of the encryption stored in the encryption necessity DB 524 are set in advance by an administrator or the like. The administrator or the like can appropriately add, change, or delete data stored in the encryption necessity DB 524 when, for example, the configuration of the communication network 20 is changed.

It is sufficient that the terminal ID and the relay device ID according to the embodiment are information, such as a language, a letter, a symbol, or various signs, used for uniquely identifying the transmission terminal 10 and the relay device 30. Alternatively, the terminal ID and the relay device ID may be identification information formed of a combination of at least two of the language, the letter, the symbol, and the various marks. In the embodiment, the IP address of the relay device 30 is used as the relay device ID.

Referring back to FIG. 3, when the transmitting-receiving unit 51 receives a login request from the transmission terminal 10, the authentication unit 53 searches through the authentication DB 521 by using a terminal ID and a password contained in the login request as a search key, and confirms whether a combination of the terminal ID and the password contained in the login request is stored in the authentication DB 521 in an associated manner. Specifically, when the terminal ID and the password contained in the login request are stored in the authentication DB 521, the authentication unit 53 determines that the authentication has succeeded, and when the terminal ID and the password are not stored, determines that the authentication has failed.

The destination terminal managing unit 54 searches through the destination terminal DB 522 by using the terminal ID of the request source terminal as a search key, and specifies the transmission terminal 10 to which the request source terminal can transmit data, that is, specifies the destination terminal. The destination terminal managing unit 54 also specifies the transmission terminal 10 with which a predetermined transmission terminal 10 conducts a teleconference in response to a teleconference start request received from the transmission terminal 10.

The relay device selecting unit 55 searches through the relay device DB 523 by using the terminal ID of the request source terminal of a teleconference as a search key, and selects the relay device 30 to be used for conducting the teleconference with the destination terminal specified by the destination terminal managing unit 54.

The encryption necessity determining unit 56 determines whether it is necessary to encrypt data to be transmitted and received in the teleconference by referring to the encryption necessity DB 524. Specifically, the encryption necessity determining unit 56 searches through the encryption necessity DB 524 by using the relay device ID of the relay device 30 selected by the relay device selecting unit 55 as a search key, and specifies the necessity of the encryption associated with the relay device ID.

Figure 9:
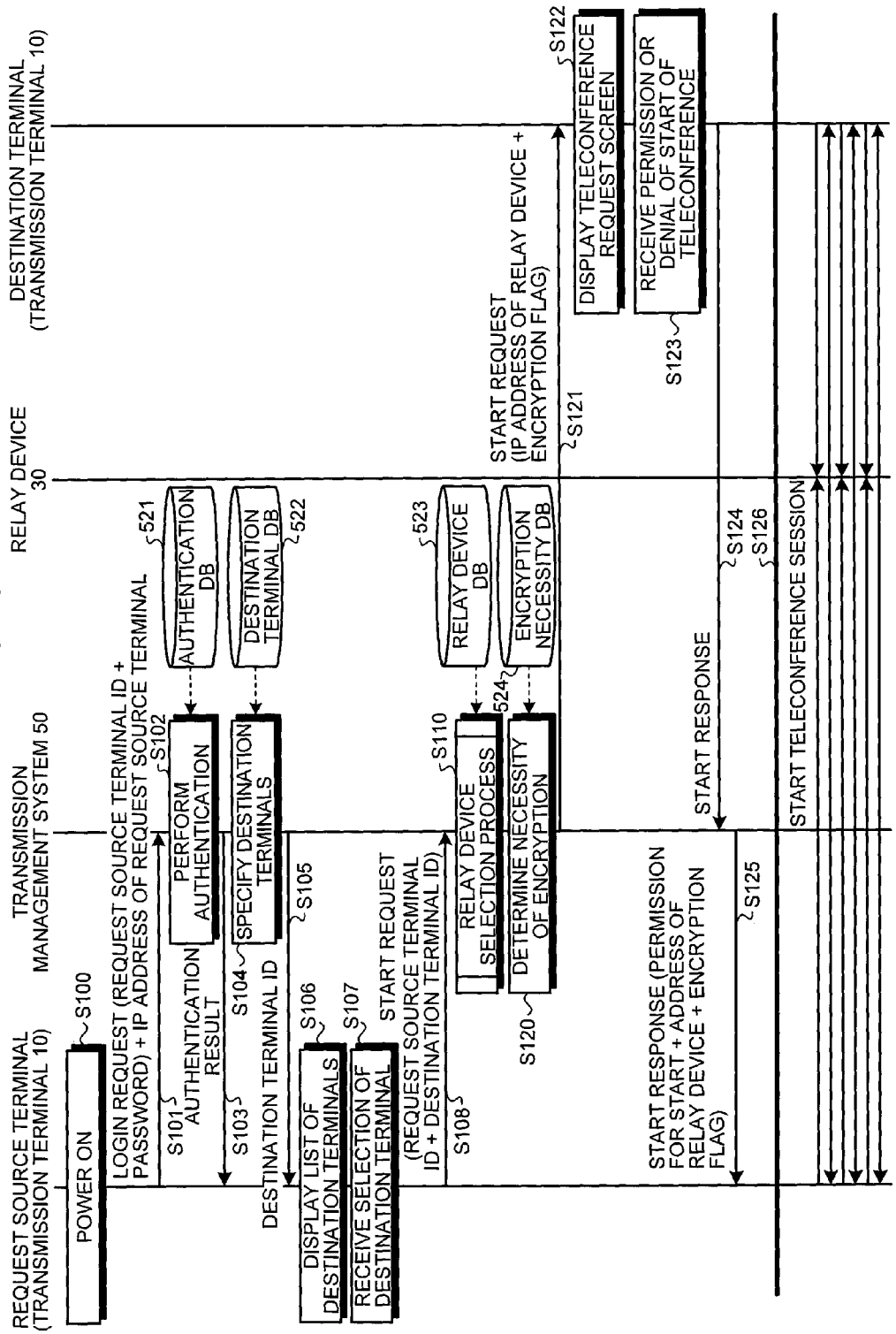
FIG. 9 is a diagram illustrating a communication sequence in the teleconference system.

FIG. 9 is a diagram illustrating a communication sequence in the teleconference system 1. In the communication sequence in FIG. 9, a process is illustrated in which an arbitrary transmission terminal 10 serving as the request source terminal starts a conference session for conducting a teleconference with the arbitrary transmission terminal 10 serving as the destination terminal. In the communication sequence illustrated in FIG. 9, various types of management information are transmitted and received by the management information session sei explained above with reference to FIG. 2.

When a user of the transmission terminal 10 turns on the power switch (to be described later) of the transmission terminal 10, the operation input receiving unit 12 illustrated in FIG. 3 receives the power-on and turns on the power (Step S100). Here, a case is explained that the transmission terminal 10 operates as the request source terminal. Subsequently, the transmitting-receiving unit 11 of the request source terminal automatically transmits the login request and the IP address of the request source terminal to the transmission management system 50 upon reception of the power-on (Step S101). The login request contains the terminal ID of the request source terminal and a password input by a user via the request source terminal. The terminal ID and the IP address of the request source terminal are stored in the storage unit 15. In this way, the request source terminal also transmits the IP address of the request source terminal to the transmission management system 50. Therefore, the transmission management system 50 can recognize the IP address of the request source terminal.

Subsequently, the authentication unit 53 of the transmission management system 50 searches through the authentication DB 521 by using the terminal ID and the password contained in the login request received via the transmitting-receiving unit 51 as a search key, and performs authentication of the request source terminal based on whether the same terminal ID and password are stored in the authentication DB 521 (Step S102).

Then, the transmitting-receiving unit 51 of the transmission management system 50 transmits an authentication result obtained by the authentication unit 53 to the request source terminal serving as a transmission source of the login request (Step S103). Hereinafter, a process will be explained in which the authentication unit 53 determines that the request source terminal has valid authorization for use.

The destination terminal managing unit 54 of the transmission management system 50 searches through the destination terminal DB 522 by using the terminal ID of the request source terminal as a search key, and reads out the terminal IDs of the candidate destination terminals that can conduct a teleconference with the request source terminal to thereby specify the destination terminals (Step S104). The transmitting-receiving unit 51 transmits the terminal IDs of the destination terminals specified by the destination terminal managing unit 54 to the request source terminal (Step S105).

In the request source terminal, when the transmitting-receiving unit 11 receives the terminal IDs of the destination terminals, the display control unit 17 of the request source terminal displays a list of the destination terminals based on the destination terminal IDs (Step S106). Therefore, the user of the request source terminal can check the destination terminals that can conduct the teleconference. The operation input receiving unit 12 receives a selection of a desired destination terminal from the user (Step S107).

Subsequently, the transmitting-receiving unit 11 of the request source terminal transmits a teleconference start request to the transmission management system 50 (Step S108). The start request contains the terminal ID of the request source terminal and the terminal ID of the destination terminal selected at Step S107.

In the transmission management system 50, when the transmitting-receiving unit 51 receives the start request, the relay device selecting unit 55 selects the relay device 30 to be used for the teleconference designated by the start request by referring to the relay device DB 523 (Step S110).

Figure 10:
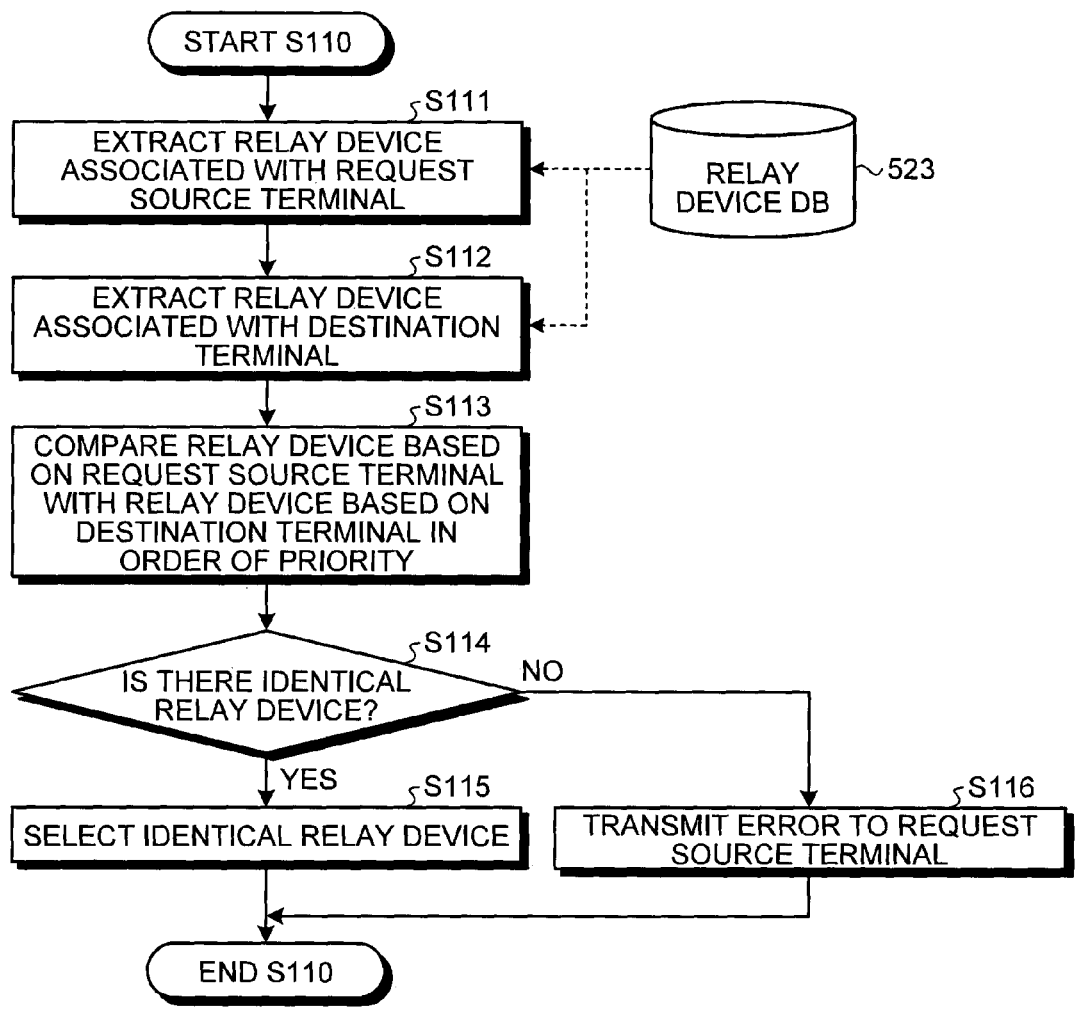
FIG. 10 is a flowchart of a detailed process performed by the transmission management system in a relay device selection process.

FIG. 10 is a flowchart of a detailed process performed by the transmission management system 50 in the relay device selection process (Step S110). In the transmission management system 50, when the transmitting-receiving unit 51 receives the start request from the request source terminal, the relay device selecting unit 55 searches through the relay device DB 523 by using the terminal ID of the request source terminal contained in the start request as a search key, and extracts the relay device IDs and the priorities associated with the terminal ID of the request source terminal (Step S111). The relay device selecting unit 55 also searches through the relay device DB 523 by using the terminal ID of the destination terminal contained in the start request as a search key, and extracts the relay device IDs and the priorities associated with the terminal ID of the destination terminal (Step S112).

Subsequently, the relay device selecting unit 55 compares the relay device IDs that are extracted based on the request source terminal at Step S111 with the relay device IDs that are extracted based on the destination terminal at Step S112 (Step S113). When there is an identical relay device ID between the relay device IDs based on the request source terminal and the relay device IDs based on the destination terminal as a result of the comparison (YES at Step S114), the relay device selecting unit 55 selects the identical relay device 30 (Step S115).

At Step S115, when there are a plurality of the identical relay devices 30 as a result of the comparison, the relay device 30 corresponding to a higher priority of the relay device ID associated with the terminal ID of the request source terminal is selected.

Furthermore, in the comparison process at Step S113, the relay device selecting unit 55 compares the relay device IDs based on the request source terminal in order starting from the relay device ID associated with the highest priority, with the relay device IDs based on the destination terminal. The relay device IDs based on the destination terminal are also compared in order starting from the relay device ID associated with the highest priority. If the relay device IDs coincide with each other, the comparison process is terminated. Therefore, it is possible to omit an unnecessary comparison process.

Meanwhile, at Step S114, when there is no identical relay device 30 (NO at Step S114), the transmitting-receiving unit 51 transmits an error to the request source terminal (Step S116). Thus, the transmission management system 50 completes the relay device selection process (Step S110).

Referring back to FIG. 9, after the relay device selection process (Step S110), the encryption necessity determining unit 56 of the transmission management system 50 determines whether data to be transmitted and received between a plurality of the transmission terminals 10 that conducts the teleconference needs to be encrypted in the teleconference (Step S120). Specifically, the encryption necessity determining unit 56 searches through the encryption necessity DB 524 by using the relay device ID selected at Step S110 as a search key, and specifies the encryption flag associated with the relay device ID. The encryption necessity determining unit 56 determines that the encryption is not needed when the encryption flag of "FALSE" is specified, and determines that the encryption is needed when the encryption flag of "TRUE" is specified.

Subsequently, the transmitting-receiving unit 51 of the transmission management system 50 transmits a teleconference start request to the transmission terminal 10 serving as the destination terminal (Step S121). The start request transmitted to the destination terminal contains the IP address of the relay device 30 selected in the relay device selection process (Step S110) and contains the encryption flag specified in the encryption necessity determination process (Step S120). Therefore, the destination terminal can recognize the relay device 30 to be used in the teleconference, in addition to the teleconference start request. Furthermore, the destination terminal can recognize whether it is necessary to encrypt information transmitted in the teleconference.

In the destination terminal, when the transmitting-receiving unit 11 receives the start request from the transmission management system 50, the display control unit 17 of the destination terminal displays a teleconference request screen on a display (Step S122). The teleconference request screen contains information indicating that the teleconference start request is received. A user of the destination terminal can recognize that the start request is received by viewing the teleconference request screen.

Subsequently, when the destination terminal receives an input about whether to permit or deny the start of the teleconference from the user via the operation input receiving unit 12 (Step S123), the transmitting-receiving unit 11 transmits a start response, which indicates whether to permit or deny the start of the teleconference and which is input by the user, to the transmission management system 50, (Step S124). When the user has input permission for the start of the teleconference, the start response contains information indicating the permission for the start. On the other hand, when the user has input denial of the start of the teleconference, the start response contains information indicating the denial of the start.

Hereinafter, a case is explained that, at Step S124, the destination terminal transmits the start response indicating permission for the start to the transmission management system 50. In the transmission management system 50, when receiving the start response from the transmission terminal 10 serving as the destination terminal, the transmitting-receiving unit 51 transmits the start response to the request source terminal (Step S125). The start response transmitted to the request source terminal contains information indicating permission for the start, the IP address of the relay device 30 selected in the relay device selection process (Step S110), and the encryption flag specified in the encryption necessity determination process (Step S120).

After the above processes are completed, a teleconference session starts (Step S126), and the teleconference is started between the request source terminal and the destination terminal. In the teleconference, data transmission between the request source terminal and the destination terminal is performed via the relay device 30 selected in the relay device selection (Step S110).

At Step S124, when the destination terminal transmits the start response indicating denial of the start to the transmission management system 50, the transmission management system 50 transmits the start response indicating denial of the start to the request source terminal 10, and the process ends.

Figure 11:
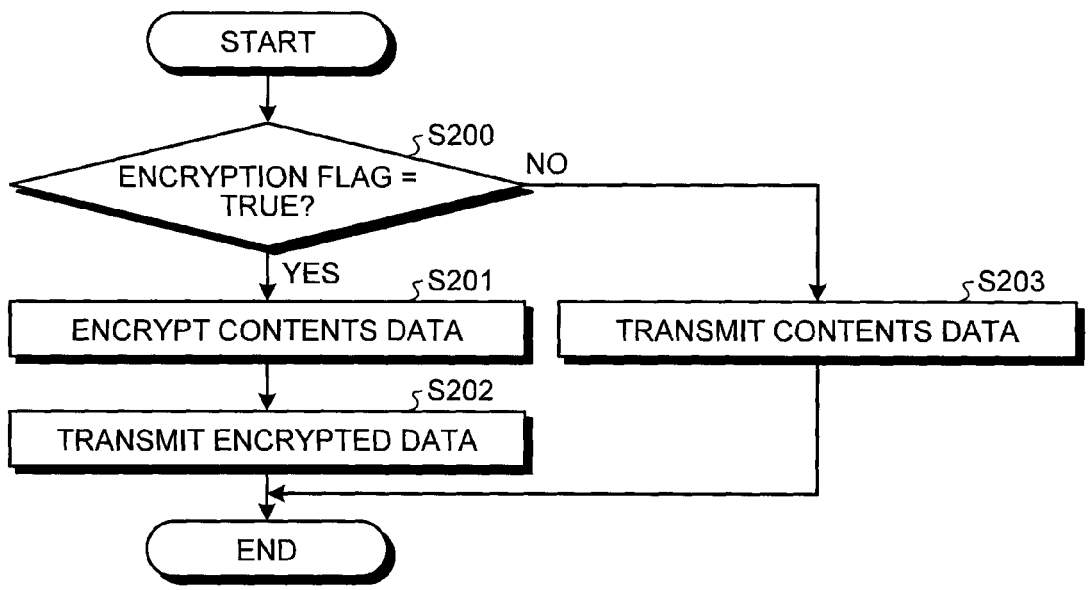
FIG. 11 is a flowchart of a data transmission process performed by the transmission terminal in a teleconference.

FIG. 11 is a flowchart of a data transmission process performed by the transmission terminal 10 in the teleconference. When the encryption flag contained in the start request received by the destination terminal at Step S121 in FIG. 9 and the encryption flag contained in the start response received by the request source terminal at Step S125 are "TRUE" (YES at Step S200), the cryptography processing unit 18 encrypts the contents data to be transmitted (Step S201). The transmitting-receiving unit 11 transmits the encrypted contents data, that is, the encrypted data, to the relay device 30 (Step S202).

At Step S200, when the encryption flag contained in the start response is "FALSE" (NO at Step S200), the cryptography processing unit 18 does not perform an encryption process, and the transmitting-receiving unit 11 transmits the contents data to the relay device 30 (Step S203). Thus, the transmission terminal 10 completes the data transmission process.

Figure 12:
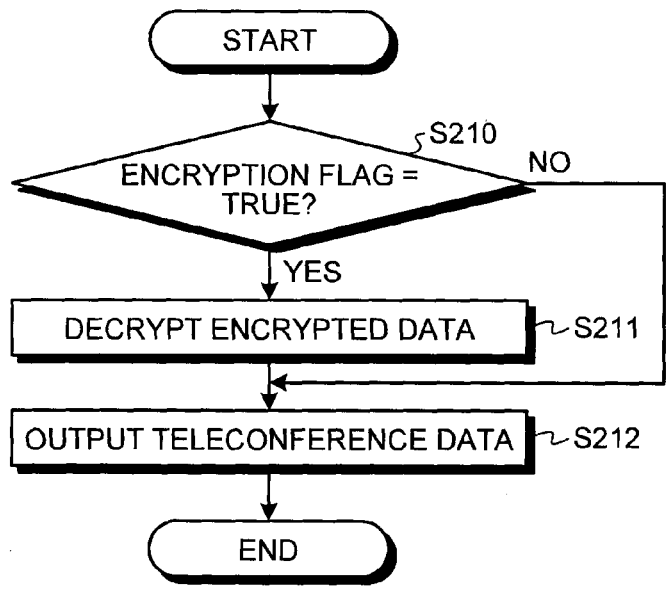
FIG. 12 is a flowchart of a data reception process performed by the transmission terminal in the teleconference.

FIG. 12 is a flowchart of a data reception process performed by the transmission terminal 10 in the teleconference. When the encryption flag contained in the start request received by the destination terminal at Step S121 in FIG. 9 and the encryption flag contained in the start response received by the request source terminal at Step S125 are "TRUE" (YES at Step S210), the transmitting-receiving unit 11 receives the encrypted teleconference data, that is, the encrypted data, from the relay device 30. Therefore, the cryptography processing unit 18 decrypts the encrypted data to obtain the teleconference data (Step S211).

Subsequently, the voice output unit 16 and the display control unit 17 output the voice data and the image data, respectively, as the teleconference data (Step S212). At Step S210, when the encryption flag contained in the start response is "FALSE" (NO at Step S210), the cryptography processing unit 18 does not perform a decryption process, and the process goes to Step S212. Thus, the transmission terminal 10 completes the data reception process.

Figure 13:
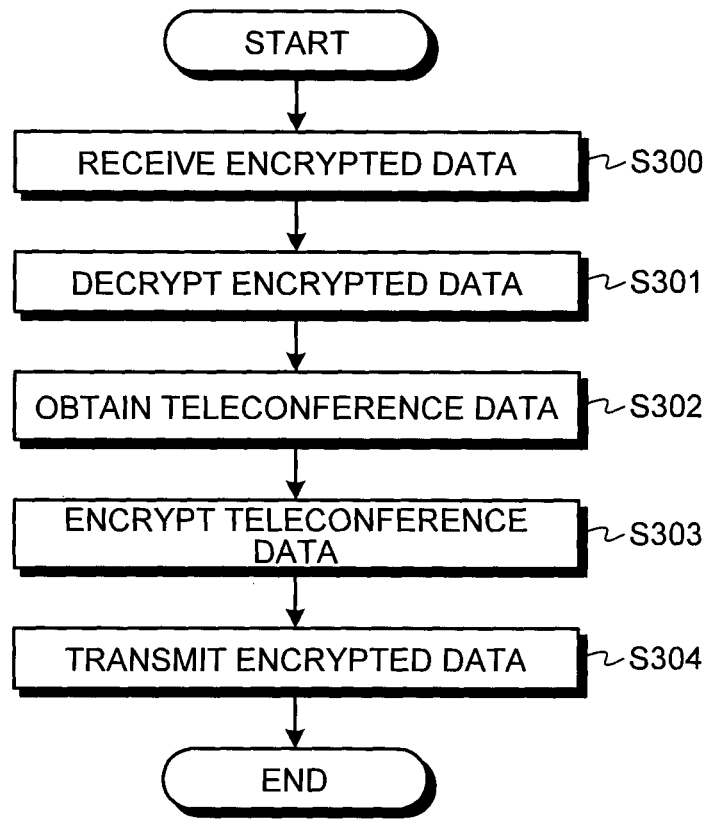
FIG. 13 is a flowchart of a data transmission-reception process performed by the relay device in the teleconference.
Figure 14:
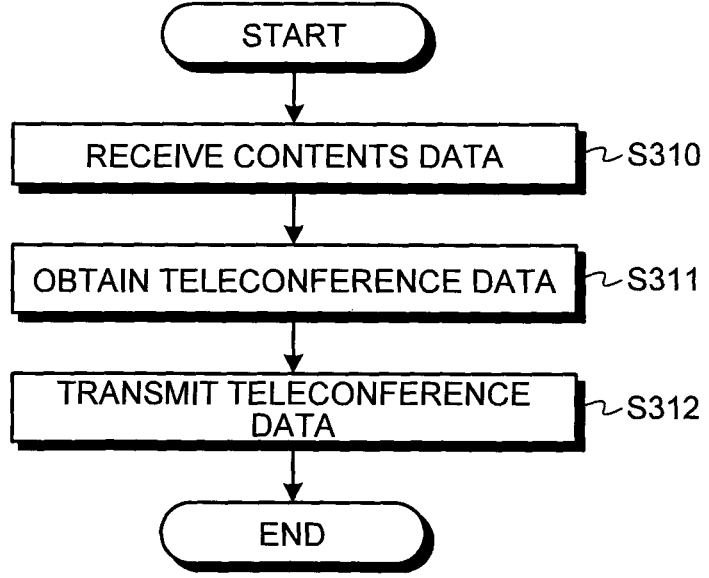
FIG. 14 is a flowchart of a data transmission-reception process performed by the relay device in the teleconference.

FIG. 13 and FIG. 14 are flowcharts of data transmission-reception processes performed by the relay device 30 in the teleconference. FIG. 13 illustrates a process performed by the relay device 30 that encrypts transmission-reception data. FIG. 14 illustrates a process performed by the relay device 30 that does not encrypt transmission-reception data. When the relay device 30 that encrypts the transmission-reception data is selected in the relay device selection process (Step S110) illustrated in FIG. 9, the selected relay device 30 that performs encryption transmits and receives data in the teleconference, and, when the relay device 30 that does not encrypt the transmission-reception data is selected in the relay device selection process (Step S110), the selected relay device 30 that does not perform encryption transmits and receives data in the teleconference.

In the data transmission-reception process performed by the relay device 30 that performs encryption illustrated in FIG. 13, when the transmitting-receiving unit 31 receives encrypted data from the transmission terminal 10 (Step S300), the cryptography processing unit 34 decrypts the received encrypted data to obtain the contents data (Step S301). At Step S300 and Step S301, encrypted data is received from each of the transmission terminals 10, and the pieces of the encrypted data are decrypted to obtain a plurality of pieces of the contents data.

Subsequently, the contents data editing unit 33 edits the plurality of pieces of the contents data obtained at Step S301, thereby obtaining the teleconference data (Step S302). Then, the cryptography processing unit 34 encrypts the teleconference data, thereby obtaining encrypted data (Step S303). Subsequently, the transmitting-receiving unit 31 transmits the encrypted data to the transmission terminal 10 (Step S304). Thus, the data transmission-reception process performed by the relay device 30 that performs encryption is completed.

In the data transmission process performed by the relay device 30 that does not perform encryption illustrated in FIG. 14, the transmitting-receiving unit 31 receives the contents data from a plurality of the transmission terminals 10 (Step S310). Subsequently, the contents data editing unit 33 edits the contents data, thereby obtaining the teleconference data (Step S311). Then, the transmitting-receiving unit 31 transmits the teleconference data to the transmission terminal 10 (Step S312). Thus, the data transmission-reception process performed by the relay device 30 that does not perform encryption is completed.

The data transmission process explained above with reference to FIG. 13 and FIG. 14 includes the process for editing the contents data to generate the teleconference data (Step S302 and Step S311). However, this process may be omitted appropriately. Specifically, the relay device 30 may transmit the contents data without editing the contents data. The relay device 30 may dynamically determine whether to edit the contents data depending on, for example, the status of network bandwidth or the like.

As described above, in the teleconference system 1 according to the embodiment, the necessity to encrypt data to be transmitted is set in advance in the relay device DB 523 in association with the relay device 30 that relays the data transmitted and received between the transmission terminals 10. Therefore, the transmission terminal 10 and the relay device 30 can automatically omit encryption of data to be transmitted via a transmission path including only the internal network without the external network, and can automatically encrypt only data to be transmitted via a transmission path including the external network.

Therefore, it becomes possible to eliminate an unnecessary encryption process, enabling to reduce the consumption of hardware resources or the like due to the encryption process. As a result, it becomes possible to prevent reduction in the data transmission quality, such as a communication delay of the contents data, video loss, or audio jumping, due to processing loads. Therefore, the teleconference system 1 can perform high-quality data transmission.

Figure 15:
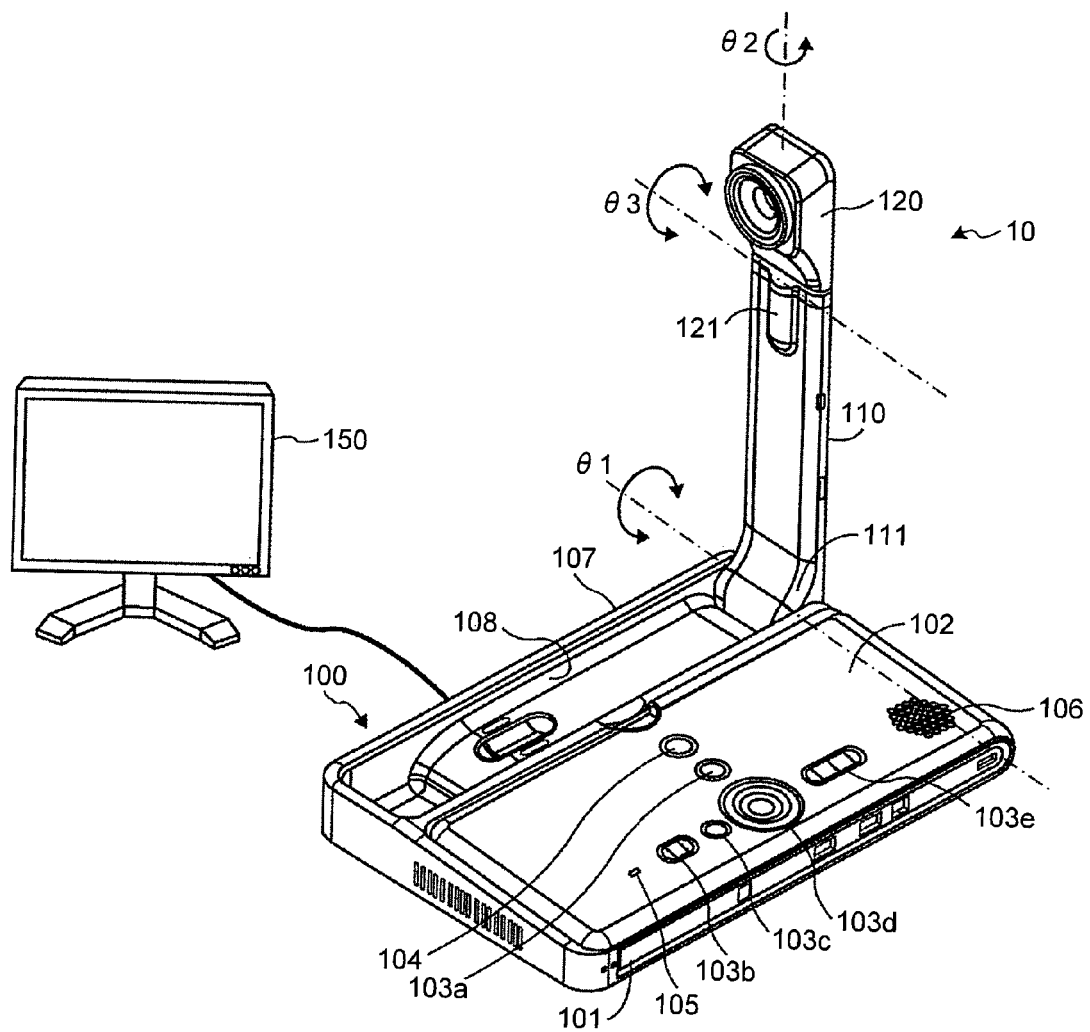
FIG. 15 is an external view of the transmission terminal.

FIG. 15 is an external view of the transmission terminal 10. The transmission terminal 10 includes a housing 100, an arm 110, and a camera housing 120. An operation panel 102 is formed on a right-side wall 101 of the housing 100. The operation panel 102 includes a plurality of operation buttons 103a to 103e as an operation input unit, a power switch 104, an alarm lamp 105, a sound output surface 106 for outputting voice from a built-in speaker, and the like.

A housing portion 108 as a concave portion for housing the arm 110 and the camera housing 120 is formed on a left-side wall 107 of the housing 100. A display 150 is connected to the housing 100 of the transmission terminal 10 via a cable.

The arm 110 is attached to the housing 100 via a torque hinge 111 such that the arm 110 can rotate in the vertical direction within a tilt angle θ1 of 135° with respect to the housing 100. FIG. 15 illustrates a state in which the tilt angle θ1 is 90°.

A built-in camera to be described later is installed in the camera housing 120, and the camera can capture an image of a user, a document, a room, or the like. A torque hinge 121 is formed on the camera housing 120. The camera housing 120 is attached to the arm 110 via the torque hinge 121. The camera housing 120 is structured such that the torque hinge 121 can rotate in the vertical and horizontal directions within a pan angle θ2 of ±180° on the assumption that the pan angle is 0° in the state illustrated in FIG. 15, and within a tilt angle θ3 of ±45° with respect to the arm 110.

Figure 16:
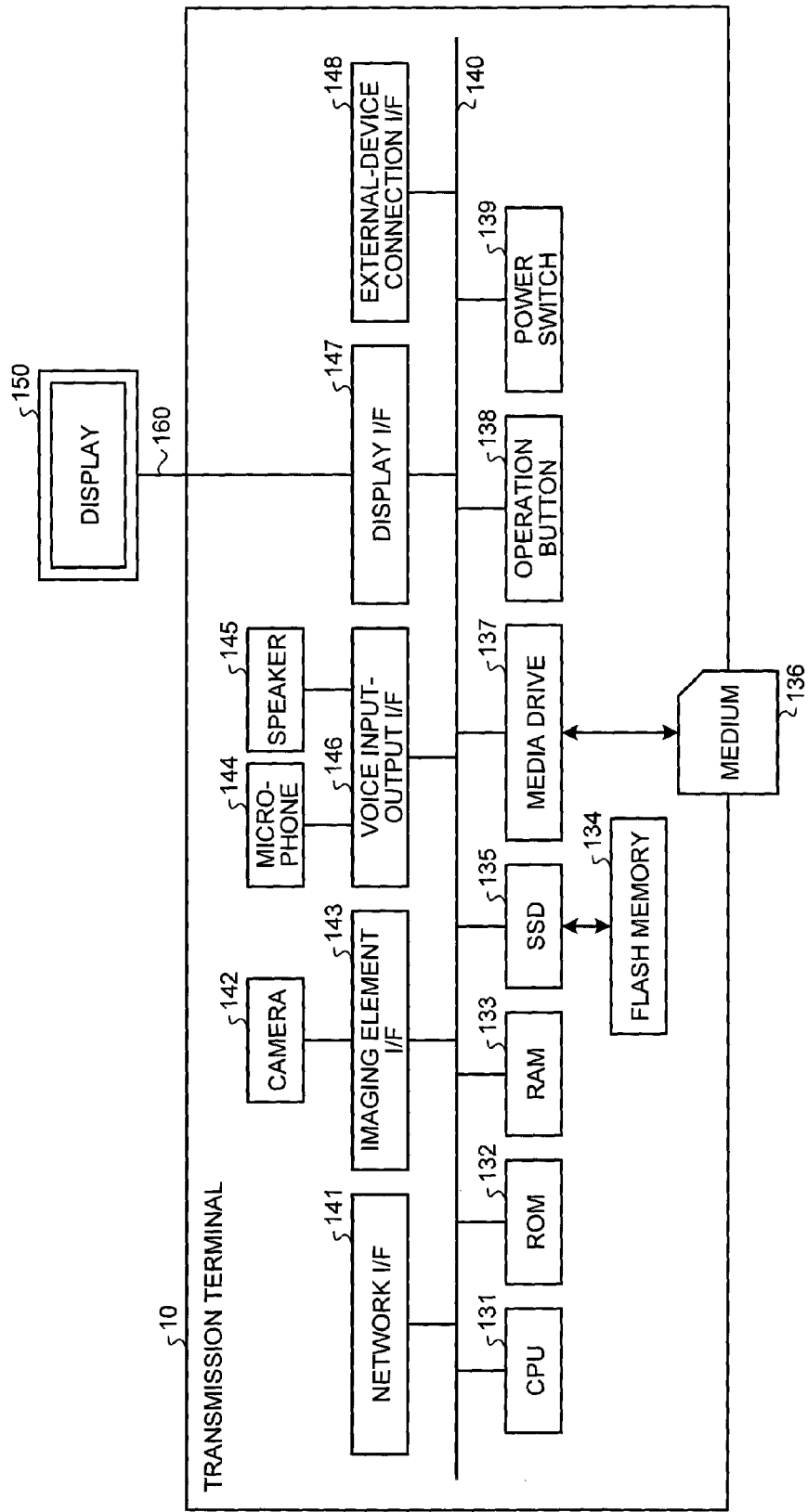
FIG. 16 is a hardware configuration diagram of the transmission terminal.

FIG. 16 is a hardware configuration diagram of the transmission terminal 10. As illustrated in FIG. 16, the transmission terminal 10 according to the embodiment includes a central processing unit (CPU) 131 for controlling the whole operation of the transmission terminal 10; a read only memory (ROM) 132 for storing a program, such as an initial program loader (IPL), used for driving the CPU 131; a random access memory (RAM) 133 used as a working area of the CPU 131; a flash memory 134 for storing various types of data, such as a transmission terminal program, image data, or voice data; a solid state drive (SSD) 135 for controlling read and write of various types of data from and to the flash memory 134 under the control of the CPU 131; a media drive 137 for controlling read and write (storage) of data from and to a recording medium 136, such as a flash memory; an operation button 138 to be operated for selecting a destination from the transmission terminal 10 or the like; a power switch 139 for switching on or off the power to the transmission terminal 10; and a network interface (I/F) 141 for transmitting data by using the communication network 20.

The transmission terminal 10 also includes a built-in camera 142 that captures an image of a subject and obtains image data of the image under the control of the CPU 131; an imaging element I/F 143 for controlling operations of the camera 142; a built-in microphone 144 for inputting voice; a built-in speaker for outputting voice; a voice input-output I/F 146 for performing an input-output process on a voice signal between the microphone 144 and a speaker 145 under the control of the CPU 131; a display I/F 147 for transmitting image data to the external display 150 under the control of the CPU 131; an external-device connection I/F 148 for connecting various external devices; and a bus line 140, such as an address bus or a data bus, for electrically connecting the above components as illustrated in FIG. 16.

The display 150 is a display unit made with liquid crystal or organic electroluminescent (EL) for displaying an image of a subject, an operation icon, or the like. The display 150 is connected to the display I/F 147 via a cable 160. The cable 160 may be a cable for an analog RGB (VGA) signal, may be a cable for component video, or may be a cable for high-definition multimedia interface (HDMI) signal or a digital video interactive (DVI) signal.

The camera 142 includes a lens and a solid-state imaging device that converts light to electrical charges in order to computerize an image (video) of a subject. A complementary metal oxide semiconductor (CMOS) or a charge coupled device (CCD) may be used as the solid-state imaging device.

To the external-device connecting I/F 148, an external device, such as an external camera, an external microphone, or an external speaker, is connectable via a universal serial bus (USB) cable or the like. When the external camera is connected, the external camera is activated in priority to the built-in camera 142 under the control of the CPU 131. Similarly, when the external microphone or the external speaker is connected, the external microphone or the external speaker is activated in priority to the built-in microphone 144 or the built-in speaker 145 under the control of the CPU 131.

The medium 136 is detachably attached to the transmission terminal 10. Any nonvolatile memory that can read and write data under the control of the CPU 131 may be used instead of the flash memory 134. For example, an electrically erasable and programmable ROM (EEPROM) may be used.

The terminal program may be distributed by being recorded in a computer-readable recording medium, such as the medium 136, in a computer-installable or a computer-executable file format. The terminal program may be stored in the ROM 132 instead of the flash memory 134.

Figure 17:
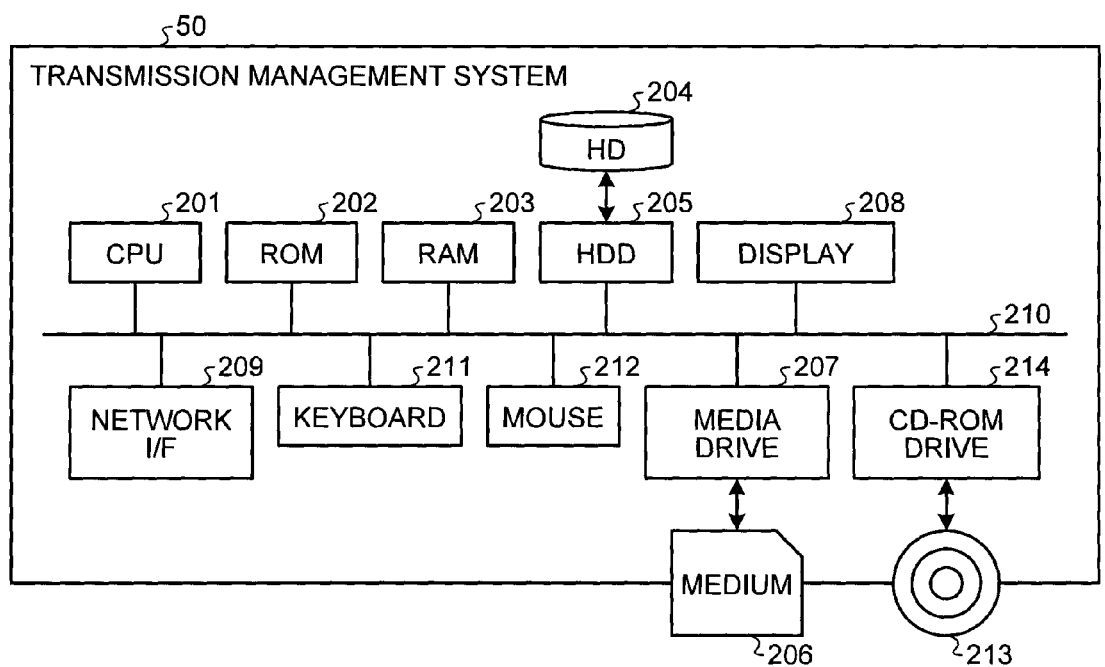
FIG. 17 is a hardware configuration diagram of the transmission management system.

FIG. 17 is a hardware configuration diagram of the transmission management system 50. The transmission management system 50 includes a CPU 201 for controlling the whole operation of the transmission management system 50; a ROM 202 for storing a program, such as an IPL, used for driving the CPU 201; a RAM 203 used as a working area of the CPU 201; an HD 204 for storing various types of data, such as a transmission management program; a hard disk drive (HDD) 205 for controlling read and write of various types of data from and to the HD 204 under the control of the CPU 201; a media drive 207 for controlling read and write (storage) of data from and to a recording medium 206, such as a flash memory; a display 208 for displaying various types of information, such as a cursor, a menu, a window, a character, or an image; a network I/F 209 for transmitting data by using the communication network 20; a keyboard 211 including a plurality of keys for inputting a character, a numeral, or various instructions; a mouse 212 used for selecting or executing various instructions, selecting a processing object, or moving a cursor; a CD-ROM drive 214 for controlling read and write of various types of data from and to a compact disc read only memory (CD-ROM) 213 that is an example of a removable recording medium; and a bus line 210, such as an address bus or a data bus, for electrically connecting the above components as illustrated in FIG. 17.

The transmission management program may be distributed by being recorded in a computer-readable recording medium, such as the medium 206 or the CD-ROM 213, in a computer-installable or a computer-executable file format. The transmission management program may be stored in the ROM 202 instead of the HD 204.

The relay device 30 has the same hardware configuration as that of the transmission management system 50; therefore, the explanation thereof is omitted. However, the HD 204 stores therein a relay device program for controlling the relay device 30. Even in this case, the relay device program may be distributed by being recorded in a computer-readable recording medium, such as the recording medium 206 or the CD-ROM 213, in a computer-installable or a computer-executable file format. The relay device program may be recorded in the ROM 202 instead of the HD 204.

As another example of the removable recording medium, a computer-readable recording medium such as a compact disc recordable (CD-R), a digital versatile disk (DVD), or a blue-ray disc may be used to record and distribute the programs.

In the embodiment, the teleconference system has been explained as a transmission system. Alternatively, the transmission system may be a data distribution system in which contents data is transmitted unidirectionally from one transmission terminal to the other transmission terminal via the transmission management system, or may be a communication system in which a plurality of transmission terminals bidirectionally communicate information or feelings via the transmission management system.

The communication system is a system for communicating information or feelings between a plurality of communication terminals (corresponding to "the transmission terminals") via a communication management system (corresponding to "the transmission management system"). Examples of the communication system include a teleconference system and a videophone system.

Furthermore, the transmission system may be a communication system for mobile phones. In this case, for example, the transmission terminal 10 corresponds to a mobile phone.

In the embodiment, a case has been explained that a teleconference is performed by the transmission system. However, the present invention is not limited by the embodiment. The transmission system may be used for a meeting, for a general conversation between families or friends, or for one-way presentation of information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A transmission management apparatus, comprising:
a receiving circuit that receives, from a first transmission terminal being one of transmission terminals connected to a network, a communication request for a communication with a second transmission terminal among the transmission terminals, terminal identification information for identifying the first transmission terminal, and terminal identification for identifying the second transmission terminal;
a first memory that stores therein terminal identification information for identifying the transmission terminals and relay device identification information for identifying a relay device in an associated manner, the relay device being connected to the network and configured to relay data transmitted and received by the first transmission terminal;
a processor that selects a relay device associated with the terminal identification information of the first transmission terminal in the first memory;
a second memory that stores therein the relay device identification information in association with encryption necessity information indicating whether it is necessary to encrypt data to be transmitted and received by the relay device identified by the relay device identification information, wherein the processor determines whether encryption is needed based on the encryption necessity information, which is obtained based only on the relay device identification information of the relay device selected by the processor; and
a transmitting circuit that transmits a determination result obtained by the processor to the first transmission terminal and the second transmission terminal, wherein the first transmission terminal and the second transmission terminal transmit data to the selected relay device based on the determination result.

2. The transmission management apparatus according to claim 1, the data transmitted and received by the first transmission terminal contains at least one of image data and voice data.

3. The transmission management apparatus according to claim 1, wherein the processor selects a relay device that is associated with the terminal identification information of the first transmission terminal and the terminal identification information of the second transmission terminal in the first memory.

4. The transmission management apparatus according to claim 1, wherein
the first memory stores therein a priority of the relay device in association with the relay device identification information, and
the processor selects a relay device with higher priority from among the relay devices associated with the first transmission terminal in the first memory.

5. The transmission management apparatus according to claim 1, wherein
the network includes an internal network connectable to local and predetermined apparatuses and an external network connectable to an unspecified number of apparatuses, and
the second memory stores therein the encryption necessity information indicating that encryption is needed, in association with the relay device identification information of the relay device that is directly connected to the external network.

6. A computer program product comprising a non-transitory computer-readable medium containing a computer program executed on a computer connected to a first transmission terminal and a second transmission terminal via a network among a plurality of transmission terminals connected to the network, the computer including a first storage unit that stores therein terminal identification information for identifying the transmission terminals and relay device identification information for identifying a relay device, the relay device being connected to the network and configured to relay data transmitted and received by the first transmission terminal, in an associated manner, and a second storage unit that stores therein the relay device identification information in association with encryption necessity information indicating whether it is necessary to encrypt data to be transmitted and received by the relay device identified by the relay device identification information, the program causing the computer to execute the steps of:
receiving, from the first transmission terminal, a communication request for a communication with the second transmission terminal, terminal identification information for identifying the first transmission terminal, and terminal identification information for identifying the second transmission terminal;
selecting a relay device associated with the terminal identification information of the first transmission terminal in the first storage unit;
determining whether encryption is needed based on the encryption necessity information, which is obtained based only on the relay device identification information of the relay device selected in the selecting step; and
transmitting a determination result obtained in the determining step to the first transmission terminal and the second transmission terminal, wherein the first transmission terminal and the second transmission terminal transmit data to the selected relay device based on the determination result.

7. A transmission system, comprising:
a plurality of transmission terminals that transmit data via a network; and
a transmission management apparatus that is connected to the transmission terminals via the network and that manages data transmission between the transmission terminals, wherein
the transmission terminals include a transmitting circuit that transmits a communication request for a communication with other transmission terminals connected to the network,
the transmission management apparatus includes
a receiving circuit that receives, from a first transmission terminal among the transmission terminals, a communication request for a communication with a second transmission terminal among the transmission terminals, terminal identification information for identifying the first transmission terminal, and terminal identification information for identifying the second transmission terminal;
a first memory that stores therein terminal identification information for identifying the transmission terminals and relay device identification information for identifying a relay device in an associated manner, the relay device being connected to the network and configured to relay data to be transmitted and received by the first transmission terminal;
a processor that selects relay device identification information associated with the terminal identification information of the first transmission terminal in the first memory;
a second memory that stores therein the relay device identification information in association with encryption necessity information indicating whether it is necessary to encrypt data to be transmitted and received by the relay device identified by the relay device identification information, wherein the processor determines whether encryption is needed based on the encryption necessity information, which is obtained based only on the relay device identification information of the relay device selected by the processor; and
a transmitting circuit that transmits a determination result obtained by the processor and the relay device identification information selected by the processor to the first transmission terminal and the second transmission terminal, and
the transmission terminals further include:
a receiving circuit that receives the determination result and the relay device identification information from the transmission management apparatus; and
a cryptography processor that encrypts data when the determination result obtained by the receiving circuit of the transmission terminal indicates that encryption is needed, wherein
the transmitting circuit of the transmission terminal transmits encrypted data to the relay device identified by the relay device identification information received by the receiving circuit.

8. A data transmission method implemented by a transmission system, the transmission system including a plurality of transmission terminals that transmits data via a network, and a transmission management apparatus that is connected to the network and that manages data transmission between the transmission terminals, wherein the transmission management apparatus includes a first memory that stores therein terminal identification information for identifying the transmission terminals and relay device identification information for identifying a relay device in an associated manner, the relay device being connected to the network and configured to relay data transmitted and received by the first transmission terminal, and a second memory that stores therein the relay device identification information in association with encryption necessity information indicating whether it is necessary to encrypt data to be transmitted and received by the relay device identified by the relay device identification information, the data transmission method comprising:

- a first transmitting step of transmitting, by the transmission terminal, a communication request for a communication with the other transmission terminals connected to the network;
- a first receiving step of receiving, by the transmission management apparatus from a first transmission terminal among the transmission terminals, a communication request for a communication with a second transmission terminal among the transmission terminals, terminal identification information for identifying the first transmission terminal, and terminal identification information for identifying the second transmission terminal;
- a relay device selecting step of selecting, by the transmission management apparatus, relay device identification information associated with the terminal identification information of the first transmission terminal in the first memory;
- an encryption necessity determining step of determining, by the transmission management apparatus, whether encryption is needed based on the encryption necessity information, which is obtained based only on the relay device identification information of the relay device selected in the relay device selecting step;
- a second transmitting step of transmitting, from the transmission management apparatus to the first transmission terminal and the second transmission terminal, a determination result obtained at the encryption necessity determining step and the relay device identification information selected at the relay device selecting step;
- a second receiving step of receiving, by the transmission terminal from the transmission management apparatus, the determination result and the relay device identification information;
- a cryptography processing step of encrypting data by the transmission terminal when the determination result received at the second receiving step indicates that encryption is needed; and
- a third transmitting step of transmitting encrypted data from the transmission terminal to the relay device identified by the relay device identification information received in the second receiving step.

* * * * *